US008811556B2

(12) United States Patent
Yamaguchi

(10) Patent No.: US 8,811,556 B2
(45) Date of Patent: Aug. 19, 2014

(54) RECEIVING CIRCUIT, CLOCK RECOVERY CIRCUIT, AND COMMUNICATION SYSTEM

(71) Applicant: Renesas Electronics Corporation, Kawasaki (JP)

(72) Inventor: Kouichi Yamaguchi, Kawasaki (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 0 days.

(21) Appl. No.: 13/892,090

(22) Filed: May 10, 2013

(65) Prior Publication Data

US 2013/0329776 A1    Dec. 12, 2013

(30) Foreign Application Priority Data

Jun. 7, 2012   (JP) .................................. 2012-129969

(51) Int. Cl.
*H04L 7/00*   (2006.01)
*H04L 25/40*   (2006.01)

(52) U.S. Cl.
USPC .......................................... 375/355; 375/371

(58) Field of Classification Search
USPC .......................................... 375/233, 355, 375
See application file for complete search history.

(56) References Cited

U.S. PATENT DOCUMENTS

| 2010/0197349 | A1  | 8/2010 | Morita et al. | |
| 2013/0128944 | A1* | 5/2013 | Zerbe et al. ................... | 375/232 |
| 2013/0163701 | A1* | 6/2013 | Buchwald et al. ............ | 375/340 |

FOREIGN PATENT DOCUMENTS

JP    2010-178137 A    8/2010

OTHER PUBLICATIONS

N. Miura, D. Mizoguchi, M. Inoue, K. Niitsu, Y. Nakagawa, M. Tago, M. Fukaishi, T. Sakurai, and T. Kuroda, "A 1 Tb/s 3 W inductive-coupling transceiver for 3D-stacked inter-chip clock and data link", IEEE Journal of Solid-State Circuits, vol. 42, 2007, pp. 111-122.
N. Miura, D. Mizoguchi, M. Inoue, T. Sakurai, and T. Kuroda, "A 195-Gb/s 1.2-W inductive inter-chip wireless superconnect with transmit power control scheme for 3-D-stacked system in a package", IEEE Journal of Solid-State Circuits, vol. 41, 2006, p. 23-34.
N. Miura, D. Mizoguchi, T. Sakurai, and T. Kuroda, "Analysis and design of inductive coupling and transceiver circuit for inductive inter-chip wireless superconnect", IEEE Journal of Solid-State Circuits, vol. 40, 2005, p. 829-837.
S. Kawai, H. Ishikuro, and T. Kuroda, "A 2.5 Gb/s/ch 4PAM inductive-coupling transceiver for non-contact memory card", 2010 IEEE International Solid-State Circuits Conference Digest of Technical Papers (ISSCC), 2010, pp. 264-265.

* cited by examiner

*Primary Examiner* — Don N Vo
(74) *Attorney, Agent, or Firm* — McGinn IP Law Group, PLLC

(57) ABSTRACT

High data-rate magnetic coupling communication is realized with a small circuit size without sacrificing the communication distance.
A received data acquisition circuit performs a decision-feedback equalization process on a received signal to obtain a shaped signal, and also performs sampling of the shaped signal with a sampling rate equal to or higher than a self-resonant frequency, according to a sampling clock, to obtain a data sample. A midpoint sample acquisition circuit performs sampling of the received signal at an intermediate timing of a sampling timing of the received data acquisition circuit to obtain a midpoint sample. A phase adjustment circuit adjusts a phase of the sampling clock, based on the data sample and the midpoint sample.

12 Claims, 14 Drawing Sheets

EYE PATTERN OF RECEIVED SIGNAL

EYE PATTERN OF SHAPED SIGNAL

SHAPED SIGNAL

RECEIVING CIRCUIT, CLOCK RECOVERY CIRCUIT, AND COMMUNICATION SYSTEM

CROSS-REFERENCE TO RELATED APPLICATION

The disclosure of Japanese Patent Application No. 2012-129969 filed on Jun. 7, 2012 including the specification, drawings and abstract is incorporated herein by reference in its entirety.

BACKGROUND

The present invention relates to magnetic coupling communication technique for transmitting signals using magnetic coupling via a transformer.

In the field of near-field contactless communication there is known a communication that uses magnetic coupling via a transformer (hereinafter referred to as "magnetic coupling communication"). In such a type of communication system, the transformer includes coils, each coil including an inductor. A transmission side transmits transmission data to a receiving side by transmitting transmission pulses that drive the inductor, with a pulse interval according to the data rate of the transmission data.

FIG. 17 shows the relation of transmission data, transmission pulses, and signals received by the receiving side (received signal) in a magnetic coupling communication system.

In FIG. 17, Rb represents the data rate of the transmission data. As shown in FIG. 17, a value 1 or 0 is treated as a single data symbol in the magnetic coupling communication system, the transmission interval (pulse interval) of data symbols being "1/Rb". The transmission side outputs transmission pulses according to the value of the transmission data. As illustrated, with regard to the wave shape of the transmission pulse, the amplitude becomes large at the positive side for the transmission data of the value 1, whereas the amplitude becomes large at the negative side for the transmission data of the value 0. Additionally, with regard to the received signal, an amplitude arises corresponding to the leading edge of the transmission pulse, and distortion occurs in the received signal since a predetermined time is required for the amplitude to settle. The above-described predetermined time is determined by the self-resonant frequency of the inductors at the transmitting and receiving sides.

FIG. 18 shows the relation between the data rate Rb and the resonance frequency fL of the inductor in a conventional magnetic coupling communication system. As shown in FIG. 18, it is known that the data rate Rb is limited to equal to or lower than about 1/3 of the self-resonant frequency of the inductor for the conventional communication system in order to prevent interference between data symbols due to distortion of the wave shape of the received signal (Non-Patent Document 4: S. Kawai, H. Ishikuro, and T. Kuroda, "A 2.5 Gb/s/ch 4PAM inductive-coupling transceiver for non-contact memory card", 2010 IEEE International Solid-State Circuits Conference Digest of Technical Papers (ISSCC), 2010, pp. 264-265.).

There have been proposed a variety of techniques for increasing the communication speed in a magnetic coupling communication system (Non-Patent Document 1: N. Miura, D. Mizoguchi, M. Inoue, K. Niitsu, Y. Nakagawa, M. Tago, M. Fukaishi, T. Sakurai, and T. Kuroda, "A 1 Tb/s 3 W inductive-coupling transceiver for 3D-stacked inter-chip clock and data link", IEEE Journal of Solid-State Circuits, vol. 42, 2007, pp. 111-122, Non-Patent Document 2: N. Miura, D. Mizoguchi, M. Inoue, T. Sakurai, and T. Kuroda, "A195-Gb/s 1.2-W inductive inter-chip wireless superconnect with transmit power control method for 3-D-stacked system in a package", IEEE Journal of Solid-State Circuits, vol. 41, 2006, p. 23, Non-Patent Document 3: N. Miura, D. Mizoguchi, T. Sakurai, and T. Kuroda, "Analysis and design of inductive coupling and transceiver circuit for inductive inter-chip wireless superconnect", IEEE Journal of Solid-State Circuits, vol. 40, 2005, p. 829, and Non-Patent Document 4). Non-Patent Document 1, for example, discloses a technique for improving the communication speed by providing a plurality of transformers and forming a plurality of channels in parallel.

Alternatively, a technique which improves the communication speed by raising the self-resonant frequency of the inductor, is conceivable.

SUMMARY

However, the technique of forming a plurality of channels by providing a plurality of transformers has a problem that the circuit size grows proportionally to the number of channels at both the transmitting and receiving sides.

In addition, although it is necessary to reduce a diameter of an inductor in order to improve the resonance frequency of the inductor, there is a problem that the communication distance becomes short with the technique of raising the self-resonant frequency of the inductor, since the signal transmission distance is comparable to the diameter of the inductor.

An aspect of the present invention is a receiving circuit which receives, via a transmission path formed by magnetic coupling of inductors at the transmission side and the receiving side, a signal corresponding to transmission data having a data rate equal to or higher than the self-resonant frequency of the inductors. The receiving circuit has a received data acquisition circuit and a clock recovery circuit.

The received data acquisition circuit performs a decision-feedback equalization process on the received signal to obtain a shaped signal and, according to a sampling clock, performs sampling of the shaped signal with a same sampling rate as the data rate to obtain a data sample.

The clock recovery circuit, which corrects the sampling clock so that the received data acquisition circuit performs sampling at a correct sampling timing, has a midpoint sample acquisition circuit and a phase adjustment circuit.

The midpoint sample acquisition circuit performs sampling of the received signal at an intermediate timing of the sampling timing of the received data acquisition circuit to obtain a midpoint sample.

The phase adjustment circuit adjusts the phase of the sampling clock, based on the data sample and the midpoint sample.

Note that an expression in which the receiving circuit of the above-mentioned aspect is replaced by a method or a device, a communication system having the receiving circuit, a transmission circuit corresponding to the receiving circuit, and a clock recovery circuit having the receiving circuit and the like are also effective as aspects of the present invention.

With the technique according to the present invention, high data-rate magnetic coupling communication can be realized with a small circuit size without sacrificing the communication distance.

DETAILED DESCRIPTION

Figure 1:
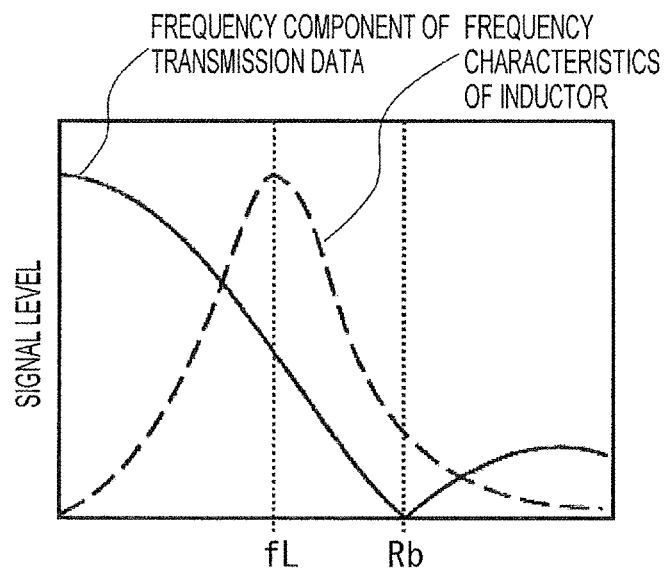
FIG. 1 is an explanatory diagram of a first technical principle.

In the following, embodiments of the present invention will be explained referring to the drawings. To clarify the explanation, the following description and drawings are abbreviated and simplified as appropriate. In all the drawings for explaining embodiments, the same symbol is attached to the same member, as a principle, and the repeated explanation thereof is omitted as needed.

Before describing specific embodiments of the magnetic coupling communication technique of the present invention, three technical principles according to the present invention will be explained first.

<First Technique>

The transmission side transmits transmission pulses that drive an inductor, at a data rate of the data rate of the transmission data equal to or higher than the self-resonant frequency of the inductor.

FIG. 1 shows an exemplary relation between a data rate Rb of the transmission data and a self-resonant frequency fL of the inductor when the first technique is applied. In the example shown in FIG. 1, the data rate Rb is higher than the self-resonant frequency fL of the inductor.

In other words, with the first technique, the transmission side outputs, to a single transformer, transmission pulses at a higher data rate than the inductor self-resonant frequency of the transmitting and receiving sides. In this manner, it is not necessary to provide a plurality of inductors in parallel, and therefore high-speed communication can be realized with a small circuit size. In addition, since it is not necessary to reduce a diameter of the inductor, communications distance is not sacrificed, either.

With the conventional magnetic coupling communication system as described above, the data rate Rb is limited to equal to or lower than about 1/3 of the self-resonant frequency of the inductor in order to prevent interference between data symbols due to distortion of the wave shape of the received signal. Therefore, setting the data rate Rb equal to or higher than the self-resonant frequency fL as with the first technique causes interference between data symbols in the received signal. The second technique solves this problem.

<Second Technique>

The second technique is used for correctly obtaining the received data, even if the data rate Rb is equal to or higher than the self-resonant frequency fL. Specifically, the receiving side performs a correction process on the received signal for dissolving the interference between data symbols, and performs sampling of shaped signals obtained by the correction process with a sampling rate similar to the data rate Rb to obtain data samples. These data samples form the data obtained by the receiving side (received data).

The correction process performed on the received signal is a decision-feedback equalization process. The process described above is specifically a process of adding, to the received signal of the current cycle, each signal (hereinafter, referred to as "correction signal") obtained by multiplying an equalization coefficient respectively to data samples obtained from received signals of n cycles (n: an integer equal to or larger than 1) immediately before the received signal of the current cycle.

The equalization coefficients may be, for example, preliminarily set, or constantly updated by a known adaptive equalization method such as the least-square method.

In addition, the value of n is associated with the ratio "Rb/fL" between the data rate Rb and the self-resonant frequency fL of the inductor, and the Q factor of the inductor. The larger the "Rb/fL" is, the larger the number of received signals before influencing the received signal of the current cycle. The larger the Q factor is, the longer it takes the amplitude of the received signal to settle. Therefore, n is determined according to "Rb/fL" and thus, the larger the "Rb/fL" is, and the larger the Q factor of the inductor is, the larger n becomes.

The second technical principle will be described in detail, taking the case of having transmitted a single bit as an example. Here, it is assumed that the value of the single bit is "1". Note that, transmitting a single bit means that no transmission is performed after having transmitted one bit.

Figure 2:
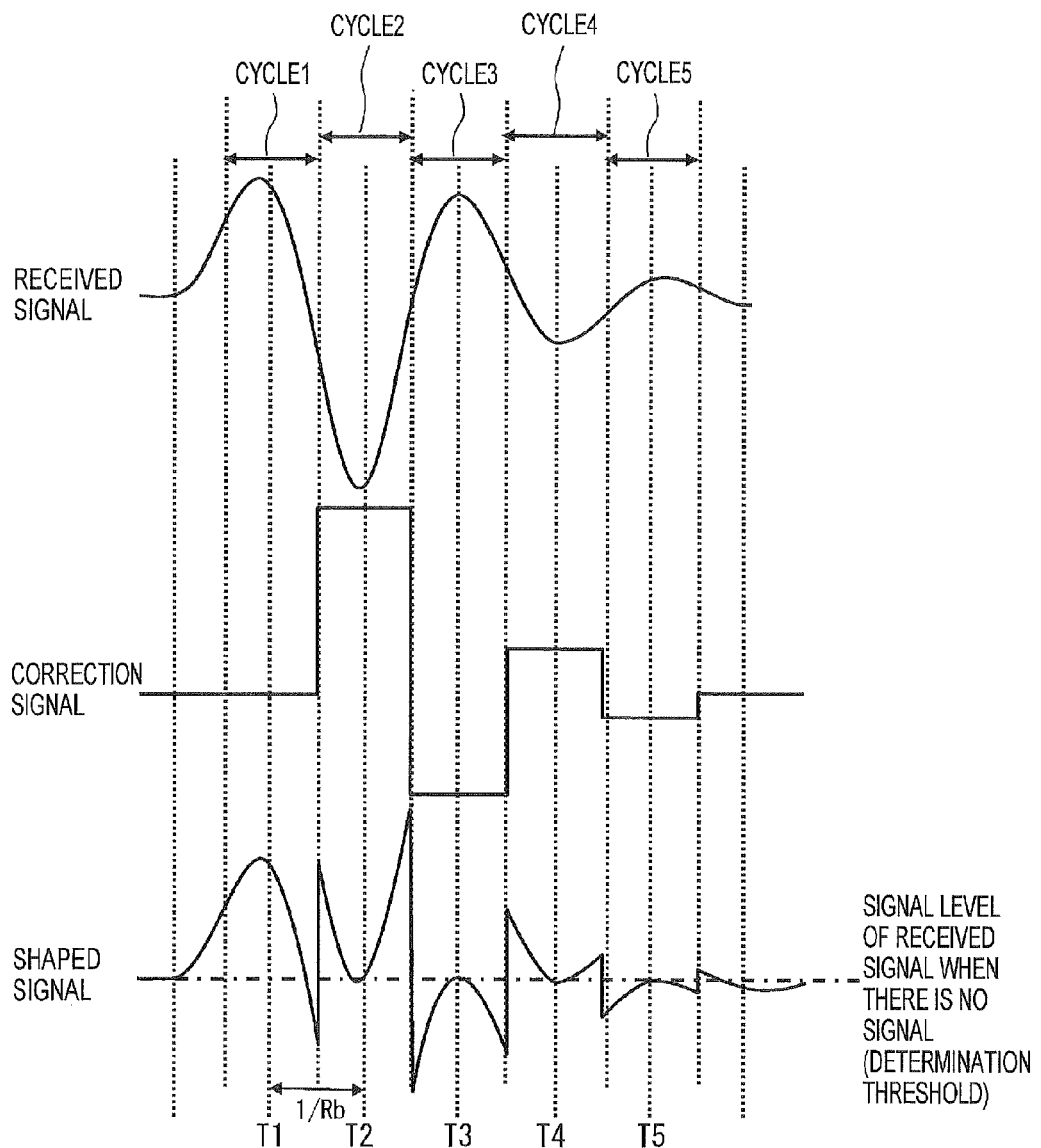
FIG. 2 is an explanatory diagram of a second technical principle.

FIG. 2 shows the relation in this case of a received signal with a correction signal and a shaped signal obtained from the received signal, for a received signal of each of subsequent cycles. T1, T2 . . . in FIG. 2 indicate sampling timings at the receiving side, where the interval between the sampling timings is "1/Rb".

Although the "1" determined at the sample timing T1 in the received wave shape corresponds to the transmitted single bit, it can be seen that a signal is also generated due to a single bit in cycles 2, 3, 4 and 5, in which there is originally no signal. Therefore, in a case where 2 bits of data "1", instead of a single bit, are transmitted in sequence of 1 and 1, although the correct data sample "1" cannot be obtained unless the voltage becomes equal to or higher than the determination threshold value at the sampling timing T2, the voltage is lowered close to 0 at the timing T2 due to interference of the data symbol of the preceding value "1" and, as a result, the sampled value at the timing T2 becomes "−1", which leads to an erroneous determination.

Therefore, instead of sampling the received signal of cycle 2 as it is, the second technique of the present invention corrects the received signals to obtain shaped signals, and performs sampling of the shaped signals. Specifically, correction is a process of adding a correction signal having a square wave shape obtained by multiplying the value (1) of the data sample of cycle 1 by the equalization coefficient. As can be seen in FIG. 2, in cycle 2, the signal level of the shaped signal obtained by correcting the received signal at the sampling timing T2 is approximately equal to the signal level when there is no signal. In this case, a positive correction signal is generated by multiplying the value "1" of the data sample of cycle 1 by a positive equalization coefficient.

Therefore, since interference due to the data symbol of cycle 1 is suppressed at the sampling timing T2 in the case where 2 bits of data "1" are transmitted in sequence of 1 and 1, the voltage becomes closer to the original voltage, and whereby the correct sampled value "1" can be made.

Similarly, interference due to the data symbol of cycle 1 can be suppressed from the received signal of cycle 3, by adding the correction signal obtained by multiplying the value (1) of the data sample of cycle 1 by the equalization coefficient. In this case, a negative correction signal is generated by multiplying the value "1" of the data sample of cycle 1 by a negative equalization coefficient.

In this manner, influence of the transmission data having a value "1" can be removed from the received signal of each cycle after cycle 2.

In the example shown in FIG. 2, influence of the data of cycle 1 affects as far as cycle 5. In such a case, it suffices to set a value 4 to the above-mentioned n. In other words, four correction signals obtained by multiplying the data samples obtained from the received signals in the four immediately preceding cycles respectively by the equalization coefficient are added to the received signal of the current cycle in the correction process.

In the above description, a signed value has been explained as the value of the data sample. In other words, transmission data having the logical value "1" corresponds to a data sample of value "1", and transmission data having the logical value "0" corresponds to a data sample of value "−1". Additionally, in the following description, it is assumed that data "1" and "0" correspond to values "1" and "−1", respectively.

The effect of the correction process by the second technique described above is apparent from eye patterns of the received signal and the shaped signal obtained by correcting the received signal. This will be described referring to FIGS. 3 and 4.

Figure 3:
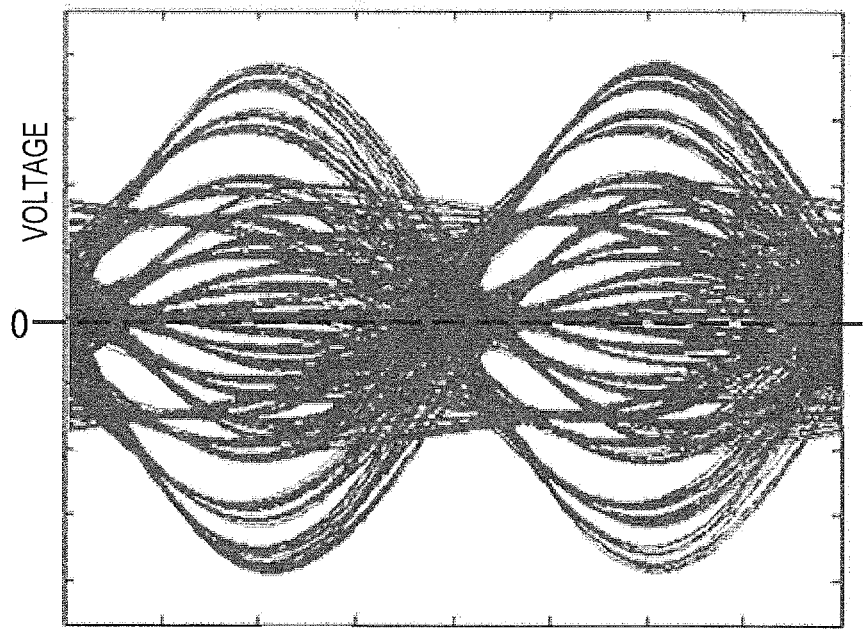
FIG. 3 is an explanatory diagram of the effect by the second technique (part 1)

FIG. 3 shows an eye pattern for the case where the above-mentioned correction process is not performed; in other words, it is an eye pattern of the received signal. As can be seen in FIG. 3, the eyes of the eye pattern of the received signal are closed due to distortion of the wave shape. For such a signal, it is difficult to determine the signal level at the time of sampling.

Figure 4:
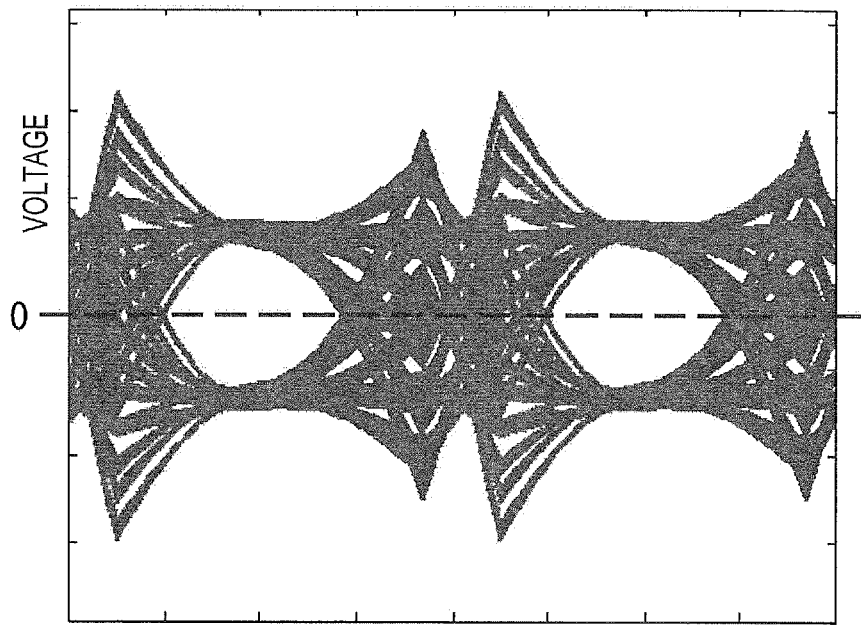
FIG. 4 is an explanatory diagram of the effect by the second technique (part 2)

FIG. 4 shows an eye pattern of the shaped signal. As can be seen in FIG. 4, distortion of the wave shape is corrected for the shaped signal, with the eyes open wide. Therefore, it is easy to determine the signal level for the shaped signal at the time of sampling. Note that, as shown in FIG. 4, the shaped signal 2 is a binary signal.

In other words, the second technique removes distortion that occurred in the received signal, by performing a correction process on the received signal. As a result, interference between data symbols is suppressed for the shaped signal obtained by the correction process, and whereby the correct received data can be obtained.

<Third Technique>

As shown in FIG. 4, a good eye pattern can be obtained according to the second technique. In order to obtain the correct data from the signal having such an eye pattern (shaped signal), it is preferred that the sampling timing is centered at the eye aperture.

In order to obtain the correct sampling timing, it is conceivable, for example, that the transmission side outputs transmission pulses, and also transmits a sampling clock. The receiving side corrects the received signal, and also performs sampling of the shaped signal at a sampling timing indicated by the clock (e.g., rising edge of the clock).

With the above-mentioned method, however, the transmission side has to transmit the clock, and also a transmission path for transmitting the clock is required. The third technique is a so-called clock recovery technique which corrects the clock at the receiving side so that the sampling timing becomes correct, without using the above-mentioned method.

Before explaining the third technique, a conventionally well-known clock recovery technique will be described first. As an example of such a technique, clock recovery using Alexander phase detection will be described.

Figure 5:
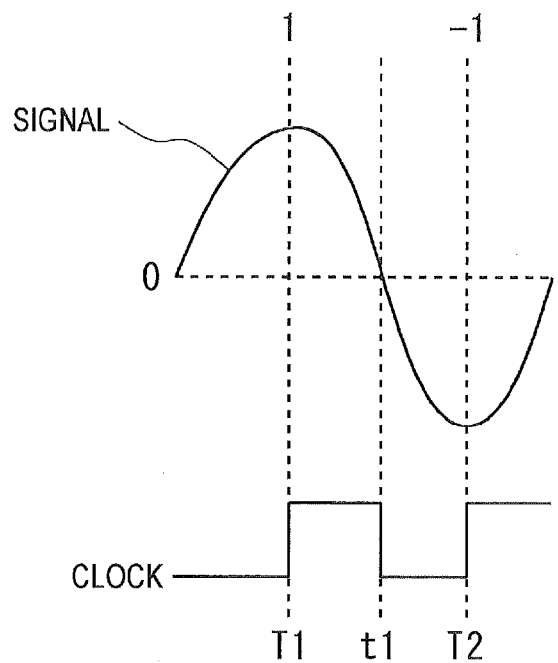
FIG. 5 is an explanatory diagram of the conventional clock phase correction technique.

For example, it is assumed that there are signals of two cycles shown in FIG. 5. The signals of two cycles represent different values, respectively. A case is considered of performing, in accordance with a clock having the same frequency as the data rate of the signals, sampling of the signals at one edge of the clock, for example, the rising edge.

If the clock phase is correct, the values obtained by sampling at the first and the second rising edges (T1, T2) of the clock are "1" and "−1", respectively.

If the clock phase is too advanced, setting the sampling timing at an intermediate timing t1 between the timings T1 and T2 results in a same sampled value "1" at both the timing T1 and the timing t1.

If, on the contrary, the clock phase is too late, a same sampled value "−1" will be obtained at both the timing t1 and the timing T2.

In other words, the phase shift of the clock can be detected by comparing the values sampled at respective sampling timings for signals of two successive cycles indicating values different from each other with a value sampled at an intermediate timing.

Clock recovery according to Alexander phase detection is based on the foregoing. Specifically, if sampled values of signals of two successive cycles are the same, phase adjustment is not performed. If, on the other hand, the sampled values of signals of two successive cycles are different and the sampled value at the intermediate timing is the same as the sampled value of the preceding signal, it is determined that the clock is advanced and the clock phase is delayed. If, on the contrary, the sampled values of signals of two successive cycles are different and the sampled value at the intermediate timing is the same as the sampled value of the subsequent signal, it is determined that the clock is late and the clock phase is advanced.

Such a clock recovery method is assumed to have a transition mode such that the voltage of signals of two successive cycles indicating values different from each other varies in the same direction (either the rising direction or the falling direction) within a period from the sampling timing of the preceding signal to the sampling timing of the subsequent signal, and is close to 0 at the intermediate timing of the sampling timing of the signals of two cycles.

However, although the voltage value at the sampling timing can be corrected to the correct voltage value since the second technique of the present invention obtains the shaped signal by adding a correction signal having a square wave shape to the received signal, the above-mentioned transition mode between sampling timings may collapse.

Figure 6:
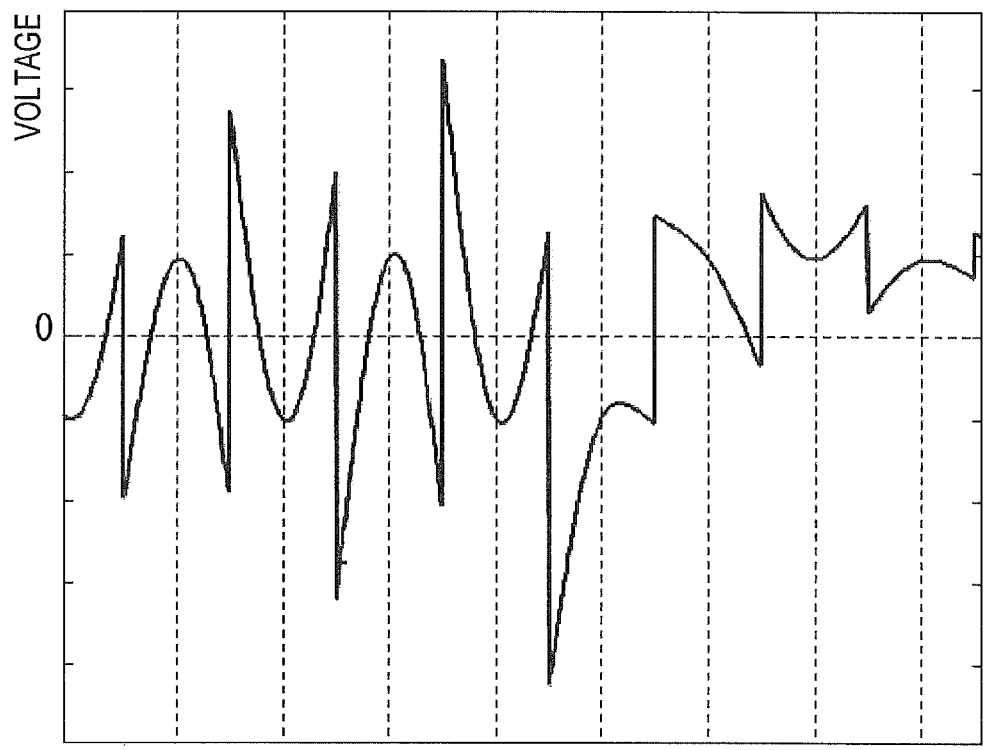
FIG. 6 is an explanatory diagram of a third technical principle (part 1)

FIG. 6 shows a shaped signal corresponding to a pattern of transmission data "10100111" obtained according to the second technique. As illustrated, since there is more than one direction of voltage variation between two successive sampling timings, there may be a plurality of points where the voltage becomes 0 (hereinafter, referred to as a "transition point").

Consequently, existence of a clock shift cannot be determined by comparing the sampled value obtained by sampling at the intermediate timing and the sampled value obtained at preceding and succeeding sampling timings (data sample).

The third technique of the present invention therefore performs sampling of the received signal before correction, instead of the shaped signal, at an intermediate timing of the sampling timings of the data in order to perform clock recovery at the receiving side. The third technique then corrects the clock, based on the data sample obtained by sampling the shaped signal and the sample obtained by sampling the received signal (hereinafter, referred to as "midpoint sample"). In the following, the third technique will be described in detail.

As a result of intensive studies and researches, the present inventors have found that, if a combination of a plurality of pieces of successive transmission data has a particular pattern, there is one voltage transition direction and only one transition point from the sampling timing of the last data of the pieces of transmission data to the next sampling timing, in the received signal before correction.

An explanation will be provided below, taking as an example, a case where a single data symbol affects four immediately succeeding data symbols.

Figure 7:
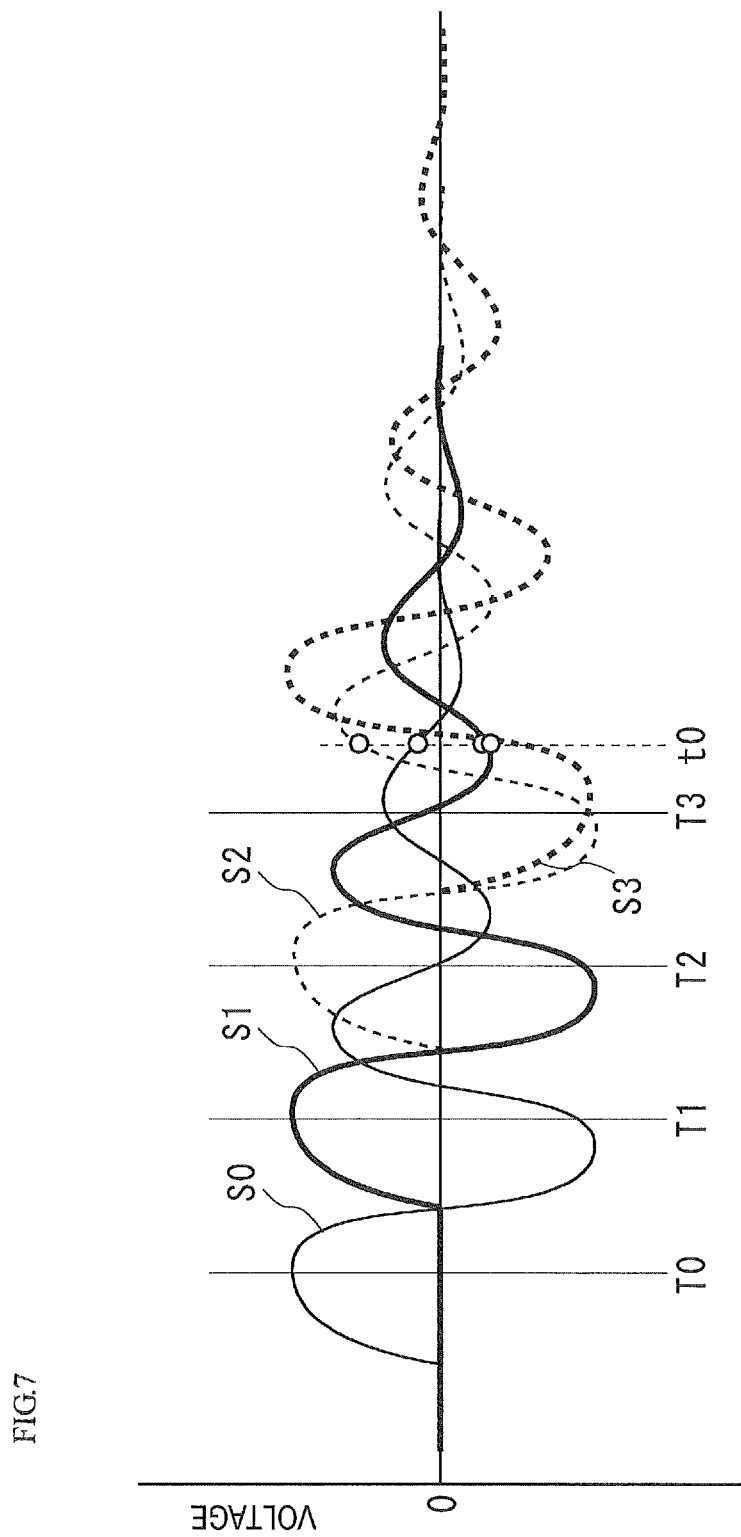
FIG. 7 is an explanatory diagram of the third technical principle (part 2)

FIG. 7 separately illustrates, when four bits of data "1110" are successively transmitted, components in the received signal due to transmission of each of the four bits of data. In the drawing, S0 (thin solid line), S1 (thick solid line), S2 (thin dotted line) and S3 (thick dotted line) respectively indicate components due to transmission of each data. Superposition of S0, S1, S2 and S3 is the received signal.

According to the second technique of the present invention, data samples 1, 1, 1 and 0 are obtained at sampling timings (T0, T1, T2 and T3) corresponding to each data, as a result of sampling the shaped signal obtained by correcting the received signal.

In the intermediate timing t0 immediately after the last data "0" of the four bits of data, attention is focused on the influence of the components S0 to S3 on the received signal.

As illustrated, the voltage of the received signal is raised due to influence of the first data bit "1" of "1110" (component S0) at the intermediate timing t0. The voltage of the received signal is lowered due to influence of the second data bit "1" (component S1). In addition, the voltage of the received signal is raised due to influence of the third data bit "1" (component S2). In addition, the voltage of the received signal is lowered due to influence of the fourth data bit "0" (component S3).

Accordingly, as a result of cancelling of the raising and the lowering of the received signal due to components S0 to S3, the voltage of the received signal becomes close to 0 at the intermediate timing t0, and the voltage of the received signal monotonically rises within a period from the sampling timing T3, via the intermediate timing t0, to the next sampling timing.

Figure 8:
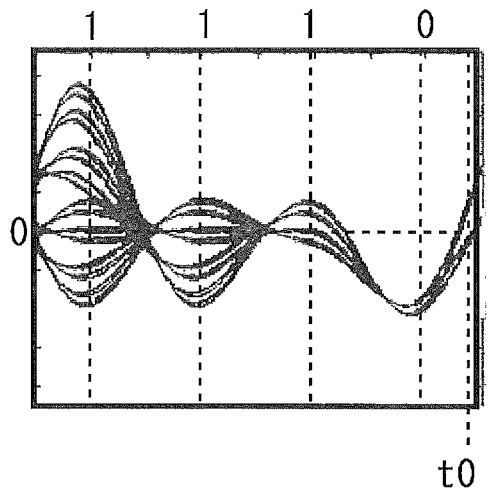
FIG. 8 is an explanatory diagram of the third technical principle (part 3)

FIG. 8 shows, in a superposed manner, a plurality of extracted received signals corresponding to the pattern "1110" of the transmission data. As illustrated, in this case, the voltage rises monotonically from the sampling timing of the last data bit "0" of "1110" to become close to about 0 at the intermediate timing t0.

As shown in FIG. 8, the rising curve of the voltage branches from near the intermediate timing t0. This is determined by whether the next data bit of the data "1110" is "1" or "0".

In the following, a data pattern such as "1110" with which the voltage rises monotonically from a sampling timing corresponding to the last data and becomes close to 0 at the intermediate timing t0 immediately after the sampling timing is referred to as a "rising pattern".

For a similar reason, "0010" and "1000" are also rising patterns, which have been confirmed by experiments.

From the above transition mode of the received signal after the sampling timing of the last data of the rising pattern, the shift of sampling timing can be determined, based on the sample value (midpoint sample) obtained by performing sampling at the intermediate timing t0 with a threshold value of 0.

For example, it can be determined that the timing of sampling is late, if the midpoint sample becomes "1" because the received signal exceeded 0 at the intermediate timing t0. If, on the contrary, the midpoint sample becomes "−1" because the received signal is equal to or lower than the threshold value at the intermediate timing t0, it can be determined that the timing of sampling is advanced.

By adjusting the clock for obtaining a data sample according to such a determination result and the clock phase for obtaining the midpoint sample, the sampling timing can be properly corrected.

In the foregoing, a method of clock recovery using a data sequence with a rising pattern has been described. Instead of a rising pattern, a data sequence with a falling pattern may be used. The data sequence with a falling pattern refers to a data sequence in which the voltage of the received signal falls monotonically from the sampling timing of the last data of the data sequence and becomes close to 0 at an intermediate timing immediately after the sampling timing of the last data.

Since the principle in which such a falling pattern exists is similar to that of the rising pattern, detailed description thereof is omitted here. In the case of the present example, "1101", "0111" and "0001" have been confirmed to be falling patterns by experiments.

Figure 9:
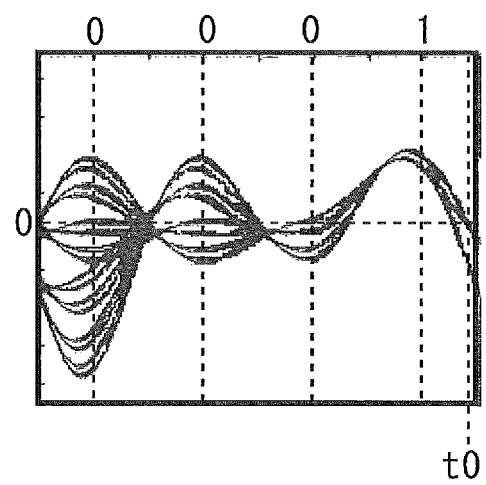
FIG. 9 is an explanatory diagram of the third technical principle (part 4).

FIG. 9 shows, in a superposed manner, a plurality of extracted received signals corresponding to the transmission data "0001", which is an exemplary falling pattern. As illustrated, in this case, the voltage falls monotonically from the sampling timing of the last data "1" of "0001" to become close to about 0 at the intermediate timing t0.

Note that, as shown in FIG. 9, the falling curve of the voltage branches from near the intermediate timing t0. This is also determined by whether the next data of the data "0001" is "1" or "0", similarly to the case of the rising pattern shown in FIG. 8.

The method of clock recovery using the falling pattern is as follows.

The timing of sampling is determined to be advanced if the midpoint sample becomes "1" as a result of performing sampling with a threshold value of 0 at an intermediate timing immediately after the sampling timing of the last data of a plurality of pieces of data of the falling pattern, whereas timing of sampling is determined to be late if the midpoint sample becomes "−1". Then, it suffices to adjust the clock phase according to the result of determination.

As thus described, according to the third technique of the present invention, clock recovery can be performed at the receiving side of a magnetic coupling communication system in which the transmission side performs transmission at a data rate equal to or higher than the self-resonant frequency of the inductor, and the receiving side corrects the received signal to obtain a shaped signal and also performs sampling of the shaped signal at a same sampling rate as the data rate to obtain data samples.

Here, whether or not to correct the clock phase based on the midpoint sample can be determined by whether a plurality of data samples immediately before the midpoint sample has a rising pattern or a falling pattern described above.

Furthermore, whether or not the data samples have a rising pattern or a falling pattern can be determined at the receiving side from a combination of a plurality of successive data samples.

Furthermore, the magnetic coupling communication system may be preliminary arranged such that the transmission side transmits the rising pattern or the falling pattern with a predetermined frequency, and the receiving side corrects the clock phase according to the frequency described above.

Although a rising pattern and a falling pattern are exemplified in the foregoing, the number of pieces of data included in the rising pattern and each value thereof are not limited to the example described above and may differ, depending on the configuration of the magnetic coupling communication system such as the Q factor of the inductor, the ratio "Rb/fL" between the data rate Rb and the self-resonant frequency of the inductor, or the like. The developer of the magnetic coupling communication system, who should be familiar with the magnetic coupling communication system at the time of development, may perform settings or the like as appropriate.

Subsequently, a magnetic coupling communication system having embodied the technique described above will be explained.

<First Embodiment>

Figure 10:
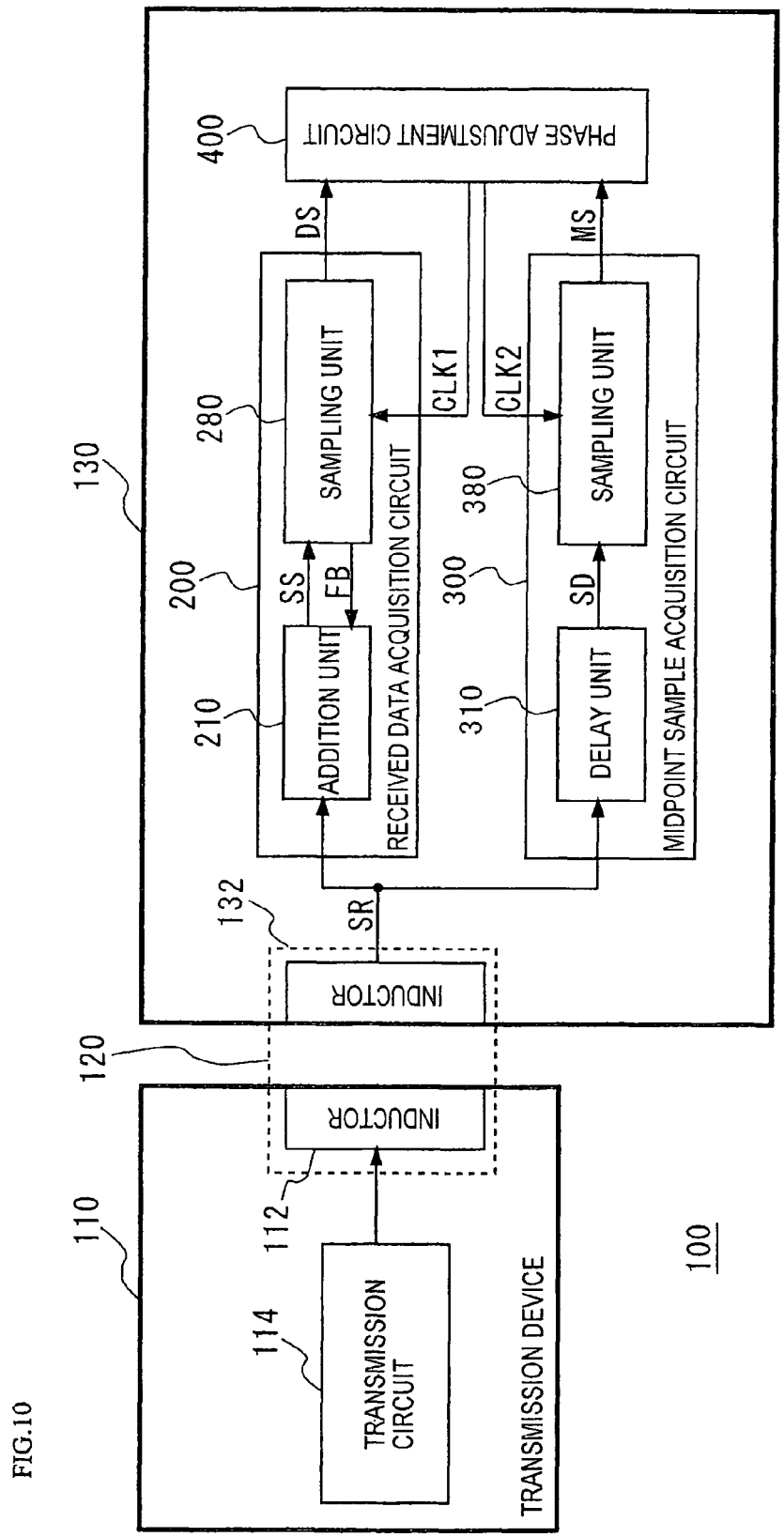
FIG. 10 shows a magnetic coupling communication system according to First Embodiment.

FIG. 10 shows a magnetic coupling communication system 100 according to First Embodiment. The magnetic coupling communication system 100 includes a transmission device 110 and a receiving device 130. The transmission device 110 has an inductor 112 and a transmission circuit 114, and the receiving device 130 has an inductor 132, a received data acquisition circuit 200, a midpoint sample acquisition circuit 300, and a phase adjustment circuit 400. The inductor 112 and the inductor 132 form a transmission path 120.

The transmission circuit 114 transmits transmission data by outputting a transmission signal which drives the inductor 112. In First Embodiment, the data rate Rb of the transmission data is equal to or higher than the self-resonant frequency fL of the inductor 112 and the inductor 132, and the transmission circuit 114 outputs a transmission signal at the data rate Rb. In other words, the transmission circuit 114 is an application of the first technique of the present invention.

In the receiving device 130, a received signal SR obtained via the inductor 132 is input to the received data acquisition circuit 200 and the midpoint sample acquisition circuit 300.

The received data acquisition circuit 200, having an addition unit 210 and a sampling unit 280, performs a decision-feedback equalization process on the received signal SR to obtain a shaped signal SS, and also performs sampling of the shaped signal SS according to a first clock CLK1 to obtain data samples DS. These data samples DS form the received data. The frequency of the first clock CLK1 is similar to the data rate Rb, and the sampling unit 280 performs sampling at the rising edge of the first clock CLK1. In other words, the sampling rate of the sampling unit 280 is similar to the data rate Rb. The addition unit 210 generates the shaped signal SS from the received signal SR and a feedback signal FB from the sampling unit 280, and the sampling unit 280 obtains the data samples DS or the feedback signal FE from the shaped signal SS. Details of the feedback signal FB will be described below.

The midpoint sample acquisition circuit 300 has a delay unit 310 and a sampling unit 380. The delay unit 310 delays the received signal SR to obtain a delayed received signal SD, and outputs it to the sampling unit 380.

The sampling unit 380 performs sampling of the delayed received signal SD at the rising edge of a second clock CLK2. The second clock CLK2 is a clock resulted from reversing the phase of the first clock CLK1. Accordingly, the sampling timing of the sampling unit 380 is an intermediate timing of sampling timings of the sampling unit 280. In the following, a sampled value MS obtained by the sampling unit 380 is referred to as a midpoint sample.

The phase adjustment circuit 400 supplies the first clock CLK1 and the second clock CLK2 to the sampling unit 280 and the sampling unit 380, respectively, and also adjusts the phases of the first clock CLK1 and the second clock CLK2, based on the data samples DS from the received data acquisition circuit 200 and the midpoint sample MS from the midpoint sample acquisition circuit 300, so that the sampling unit 280 performs sampling at the correct sampling timing.

In the receiving device 130, the midpoint sample acquisition circuit 300 and the phase adjustment circuit 400 form the clock recovery.

Figure 11:
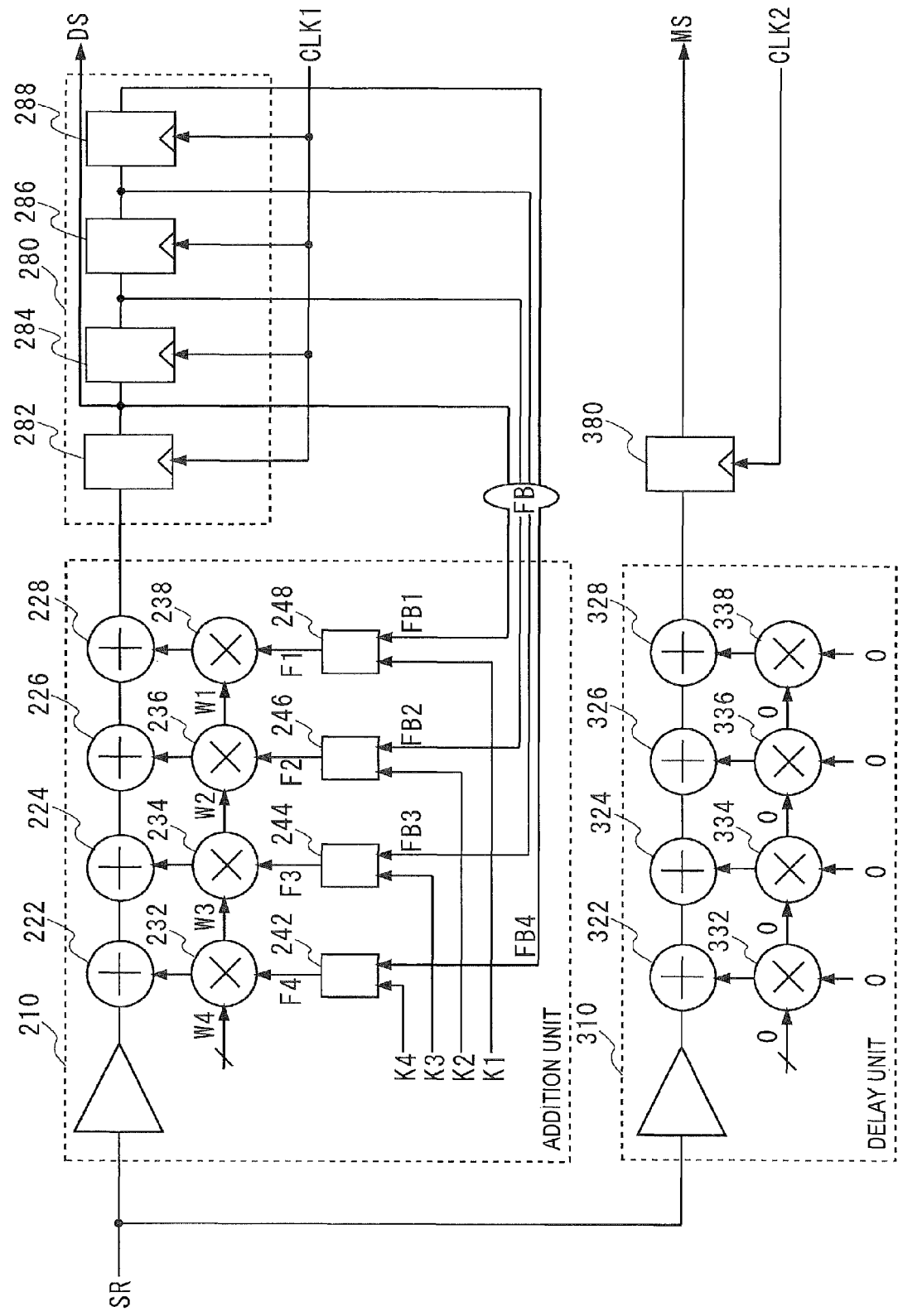
FIG. 11 shows an exemplary configuration of a received data acquisition circuit and a midpoint sample acquisition circuit in the magnetic coupling communication system shown in FIG. 10.

FIG. 11 shows a specific exemplary configuration of the received data acquisition circuit 200 and the delay unit 310 in the receiving device 130.

The addition unit 210 in the received data acquisition circuit 200 has a plurality of (e.g., four) serially-coupled stages of adders 222, 224, 226 and 228, four multipliers 232, 234, 236 and 238 respectively coupled to the adders, and four XNOR circuits 242, 244, 246 and 248 respectively coupled to the multipliers.

The adder 222 adds the received signal SR and the output of the multiplier 232, and outputs the obtained signal to the adder 224 of the next stage.

The adder 224 adds the output of the adder 222 of the preceding stage and the output of the multiplier 234, and outputs the obtained signal to the adder 226 of the next stage.

The adder 226 adds the output of the adder 224 of the preceding stage and the output of the multiplier 236, and outputs the obtained signal to the adder 228 of the next stage.

The adder 228 adds the output of the adder 226 of a preceding stage and the output of the multiplier 238, and outputs the obtained signal to the sampling unit 280. As will be apparent by the following explanation, the signal obtained by the adder 228 is the shaped signal SS.

To the multipliers 232, 234, 236 and 238, equalization coefficients W4, W3, W2 and W1 are input respectively, and also feedback signals F4, F3, F2 and F1 are input respectively. Note that, the feedback signals F4, F3, F2 and F1 are either "1" or "−1". Each multiplier multiplies the equalization coefficient (one of W4, W3, W2 and W1) input thereto and the feedback signal (one of F4, F3, F2 and F1), and outputs the result to the adder coupled thereto (one of the adders 222, 224, 226 and 228).

Note that, the equalization coefficients W4, W3, W2 and W1 are a positive value that is the absolute value.

To the XNOR circuits 242, 244, 246 and 248, equalization coefficient codes K4, K3, K2 and K1 are input respectively, and also feedback signals FB4, FB3, FB2 and FB1 from the sampling unit 280 are input respectively.

For example, in the decision-feedback equalization process which corrects the received signal shown in FIG. 2, an equalization coefficient code K1 to be input to the XNOR circuit 248 corresponding to the adder 228 at the last stage is set to "−1". In addition, the equalization coefficient codes K4 to K1 are alternately set to "1" or "−1". In other words, the equalization coefficient codes K1, K2, K3 and K4 are "−1", "1", "−1" and "1", respectively.

The feedback signals FB4, FB3, FB2 and FB1 from the sampling unit 280 are either "1" or "−1". If the input equalization coefficient code is "1", the XNOR circuits 242 to 248 output the input feedback signals as they are to the multiplier. If, on the other hand, the input equalization coefficient code is "−1", the XNOR circuits 242 to 248 invert the sign of the input feedback signal and output it to the multiplier.

For example, since the equalization coefficient code K1 to be input to the XNOR circuit 248 is "−1", the XNOR circuit 248 outputs "−1" if the feedback signal FB1 is "1", and outputs "1" if the feedback signal FB1 is "−1". In addition, for example, since the equalization coefficient code K2 to be input to the XNOR circuit 246 is "1", the XNOR circuit 246 outputs "1" if the feedback signal FB2 is "1", and outputs "−1" if the feedback signal FB1 is "−1".

In the sampling unit 280, the sampling circuit 282 and flip-flops (FF) 284 to 286 operate at the rising edge of the first clock CLK1.

Specifically, the sampling circuit 282 performs sampling of the shaped signal SS from the adder 228 at the rising edge of the first clock CLK1, with a preset determination threshold value being the reference voltage, and obtains and holds the data sample DS which is either "1" or "−1". The data sample DS which has been held in the sampling circuit 282 until the rising edge is output to the phase adjustment circuit 400 and the FF284, and also output to the XNOR circuit 248 as the feedback signal FB1.

The FF284 outputs the data sample DS being held at the rising edge of the first clock CLK1, and also latches and holds the data sample DS output from the sampling circuit 282. The data sample DS output from the FF284 is output to the FF286, and also output to the XNOR circuit 246 as the feedback signal FB2.

Similarly, the FF286 latches and outputs the data sample DS output from the sampling circuit 284 at the rising edge of the first clock CLK1. The data sample DS output from the FF286 is output to the FF288, and is also output to the XNOR circuit 244 as the feedback signal FB3.

In addition, the FF288 latches and outputs the data sample DS output from the sampling circuit 286 at the rising edge of the first clock CLK1. The data sample DS output from the FF288 is output to the XNOR circuit 242 as the feedback signal FB4.

With such a configuration of the received data acquisition circuit 200 having the addition unit 210 and the sampling unit 280, the shaped signal SS of each cycle is a signal obtained by adding, to the received signal SR of the cycle in question, respective correction signals calculated from the data samples DS of n cycles (here, n=4) immediately preceding the cycle in question, and equalization coefficients and their signs which have been respectively set according to the order of receiving the four data samples DS.

In other words, the received data acquisition circuit 200 embodies the second technique of the present invention, by which the correct data sample DS can be obtained, if the phase of the first clock CLK1 is correct, as a result of sampling the shaped signal SS of each cycle at the rising timing of the first clock CLK1.

Subsequently, a specific example of the midpoint sample acquisition circuit 300 will be described. In the midpoint sample acquisition circuit 300, the delay unit 310 is a circuit which delays the received signal SR in order to adjust the timings of the delayed received signal SD and the shaped signal SS from the addition unit 210.

As shown in FIG. 11, the delay unit 310 has four stages of serially-coupled adders 322, 324, 326 and 328, four multipliers 332, 334, 336 and 338 respectively coupled to these adders, and four XNOR circuits 242, 244, 246 and 248 respectively coupled to these multipliers. The coefficient and the sign thereof to be input to each multiplier are 0.

In other words, the delay unit 310 is a dummy addition unit having a configuration approximately similar to the addition unit 210.

The sampling unit 380 in the midpoint sample acquisition circuit 300 performs sampling of the delayed received signal SD at the rising edge of the second clock CLK2 to obtain the midpoint sample MS. The sampling unit 380 has a threshold value of "0" at the time of sampling.

Figure 12:
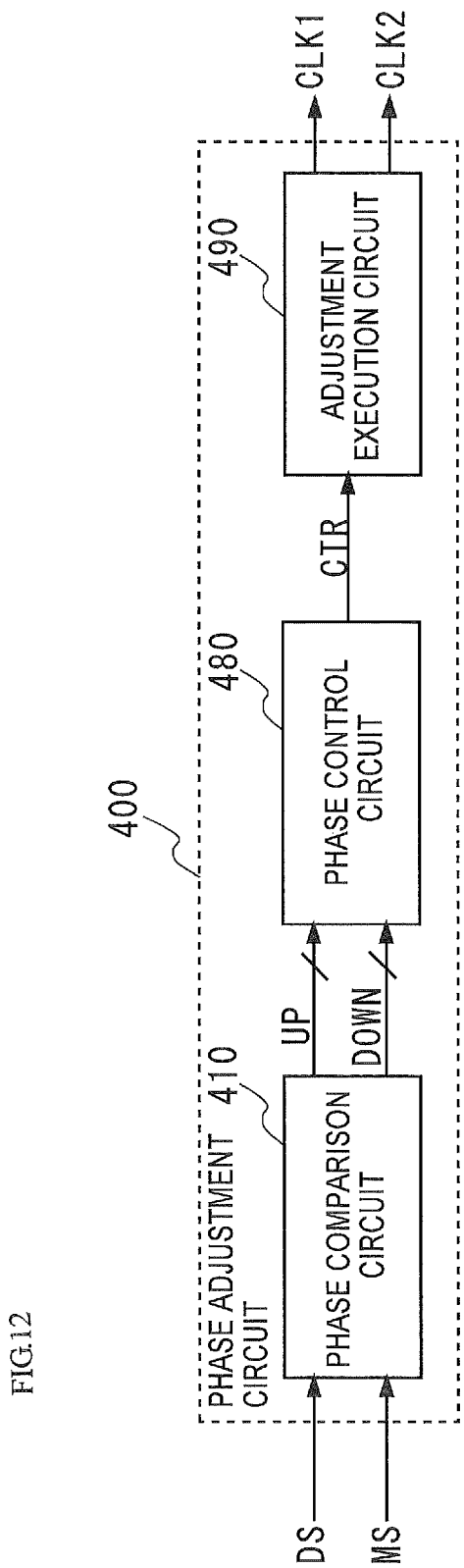
FIG. 12 shows an exemplary configuration of a phase adjustment circuit in the magnetic coupling communication system shown in FIG. 10.

FIG. 12 shows the phase adjustment circuit 400. As illustrated, the phase adjustment circuit 400 has a phase comparison circuit 410, a phase control circuit 480, and an adjustment execution circuit 490.

The phase comparison circuit 410, to which the data sample DS and the midpoint sample MS are input, outputs an UP signal and a DOWN signal. In the magnetic coupling communication system 100 of First Embodiment, the UP signal and the DOWN signal output from the phase comparison circuit 410 have a plurality of bits (e.g., 8 bits).

The phase control circuit 480 generates, according to the UP signal and the DOWN signal each having a plurality of bits from the phase comparison circuit 410, a phase control signal CTR indicating either to advance or delay the phases of the first clock CLK1 and the second clock CLK2, and outputs it to the adjustment execution circuit 490.

The adjustment execution circuit 490 performs similar adjustment of the phases of the first clock CLK1 and the second clock CLK2 according to the phase control signal CTR.

Figure 13:
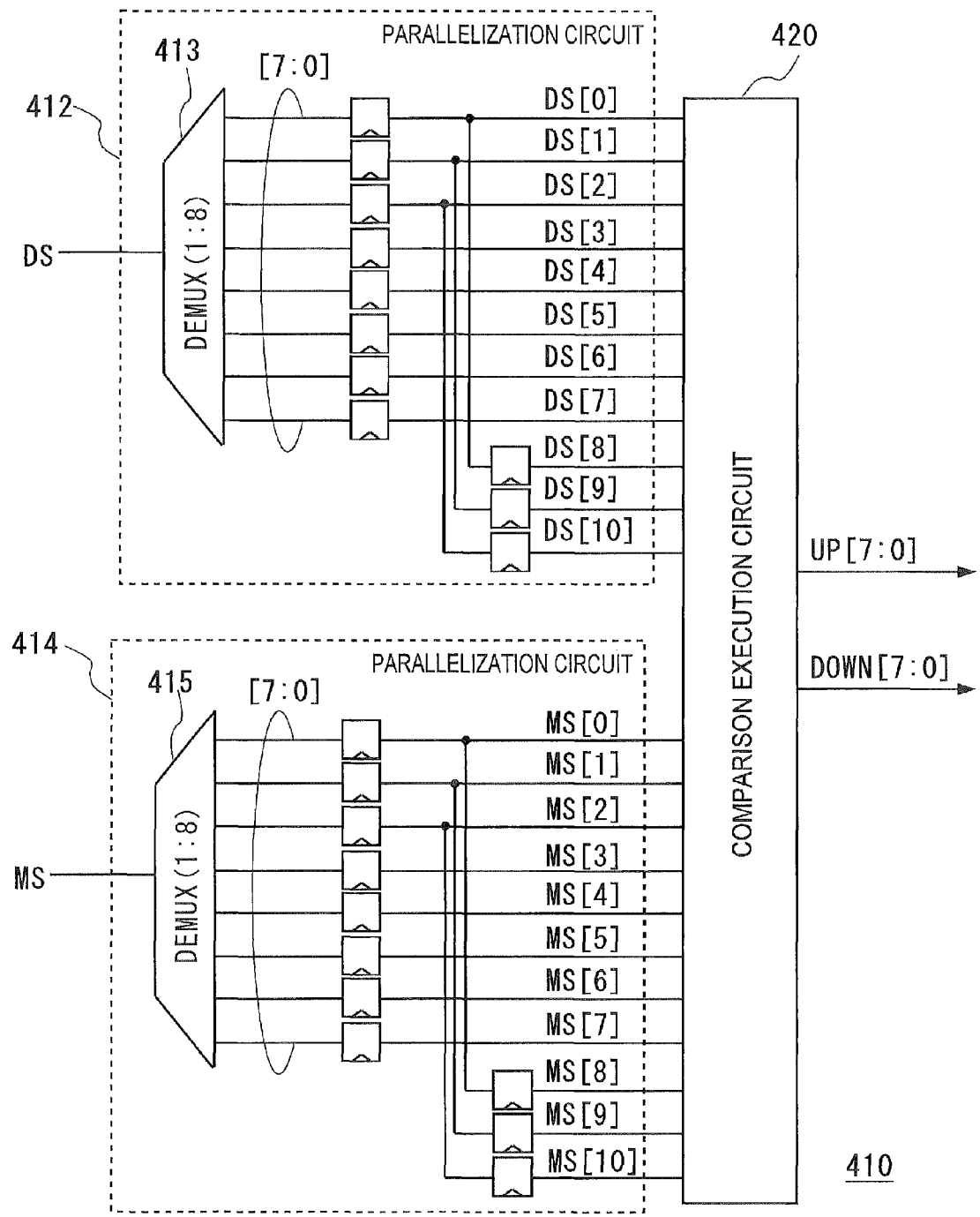
FIG. 13 shows an exemplary configuration of a phase comparison circuit in the phase adjustment circuit shown in FIG. 12.

FIG. 13 shows an exemplary configuration of the phase comparison circuit 410. The phase comparison circuit 410 has a parallelizing circuit 412, a parallelizing circuit 414, and a comparison execution circuit 420.

The parallelizing circuit 412 has a "1:8" demultiplexer 413, to which the data sample DS (1 bit) is input, and parallelizes the data sample into a plurality of bits (here, 8 bits).

The parallelizing circuit 414 has a "1:8" demultiplexer 415, to which the midpoint sample MS (1 bit) is input, and parallelizes the midpoint sample into a plurality of bits.

Figure 14:
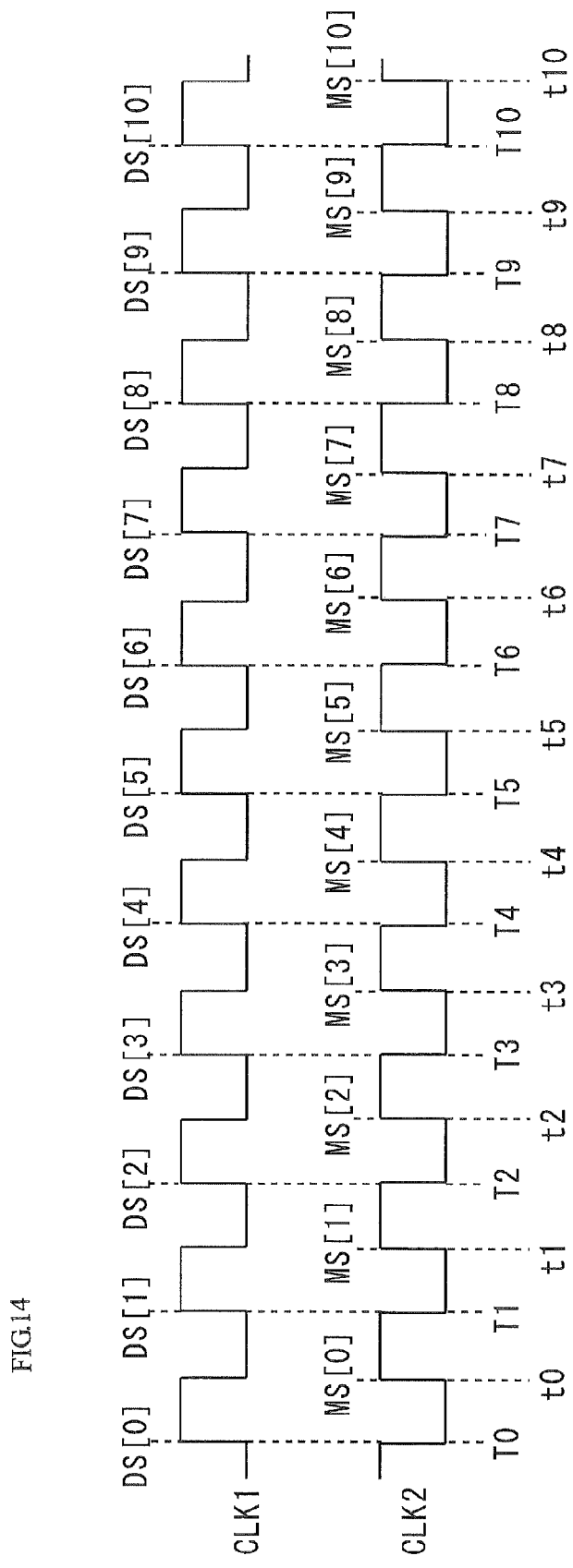
FIG. 14 is an exemplary diagram of the phase comparison circuit shown in FIG. 13.

FIG. 14 shows the relation between respective sampling timings T of the data samples DS parallelized by the parallelizing circuit 412, and respective sampling timings t of the midpoint samples MS parallelized by the parallelizing circuit 414.

As illustrated, the sampling timing tm of the (m+1)-th bit (MS[m]) of MS[10:0] is an intermediate timing immediately after the sampling timing Tm of the (m+1)-th bit (DS[m]) of DS[10:0]. For example, the sampling timing t3 of MS[3] is a timing delayed from the sampling timing T3 of DS[3] by a half cycle.

The comparison execution circuit 420 generates an 8-bit UP signal (UP[7:0]) and an 8-bit DOWN signal (DOWN[7:0], based on DS [10:0] and MS[10:0]. In UP[7:0], the bit "1" indicates that the phases of the first clock CLK1 and the second clock CLK2 are delayed whereas, in DOWN[7:0], the bit "1" indicates that the phases of the first clock CLK1 and the second clock CLK2 are advanced.

Figure 15:
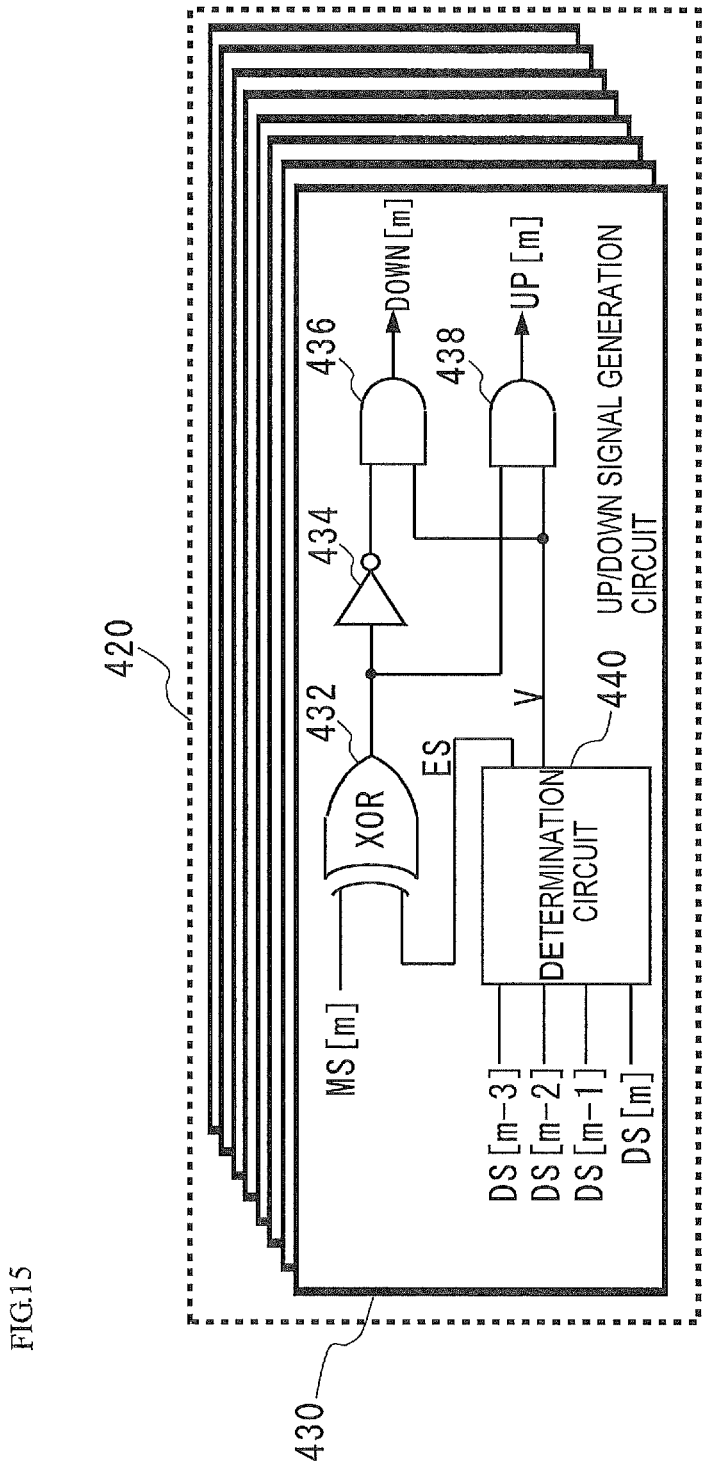
FIG. 15 shows an exemplary configuration of a comparison execution circuit in the phase comparison circuit shown in FIG. 13.

FIG. 15 shows in detail an exemplary configuration of the comparison execution circuit 420. As shown in FIG. 15, the comparison execution circuit 420 has UP/DOWN signal generation circuits 430 as many as the number of bits (here, 8) of the UP signal and the DOWN signal, and the UP/DOWN signal generation circuit 430 generates one bit of the UP signal and one bit of the DOWN signal. Since the respective UP/DOWN signal generation circuits 430 have a similar configuration, the UP/DOWN signal generation circuit 430 which generates UP[m] and DOWN[m] will be described as a representative.

The UP/DOWN signal generation circuit 430 has an XOR circuit 432, an inverter 434, an AND circuit 436, an AND circuit 438, and a determination circuit 440. Here, the operation of the circuit will be described based on the logical values "1" and "0", instead of the signal values "1" and "−1".

To the determination circuit 440, four data samples (DS [m−3], DS[m−2], DS[m−1] and DS[m]) immediately before the midpoint sample MS [m] are input. The determination circuit 440 determines whether or not these four data samples DS form a rising pattern or a falling pattern described above, and outputs a signal V and a signal ES according to the determination result to the XOR circuit 432 and the inverter 434, respectively.

Specifically, if the above-mentioned four data samples DS form neither the rising pattern nor the falling pattern as the result of determination, the determination circuit 440 outputs "0" to the signal V. In this occasion, the signal ES may be any one of "1" or "0".

If, on the other hand, the above-mentioned four data samples DS form the rising pattern as the result of determination, the determination circuit 440 outputs "1" to both the signal V and the signal ES.

In addition, if the four data samples DS form the falling pattern as the result of determination, the determination circuit 440 outputs "1" to the signal V and "0" to the signal ES.

The XOR circuit 432, to which the midpoint sample MS [m] and the signal ES are input, outputs their exclusive OR.

The output of the XOR circuit 432 is input to the inverter 434 and the AND circuit 438. The inverter 434 inverts the output of the XOR circuit 432 and outputs it to the AND circuit 436.

The AND circuit 436, to which the output of the inverter 434 and the signal V are input, outputs their logical product. The output of the AND circuit 436 is DOWN[m].

The AND circuit 438, to which the output of the XOR circuit 432 and the signal V are input, outputs their logical sum. The output of the AND circuit 438 is UP[m].

Therefore, if the four data samples (DS[m−3], DS[m−2], DS[m−1] and DS[m]) immediately before the midpoint sample MS [m] form neither the rising pattern nor the falling pattern, the signal V becomes "0" and therefore both UP[m] and DOWN[m] become "0".

If, on the other hand, DS[m−3], DS[m−2], DS[m−1] and DS[m] form a rising pattern or a falling pattern, the signal V becomes "1" and therefore either UP[m] or DOWN[m] becomes "1".

Specifically, the signal ES becomes "1" if DS[m−3], DS[m−2], DS[m−1] and DS[m] form a rising pattern, and therefore DOWN[m] becomes "1" and UP[m] becomes "0" if the midpoint sample MS [m] is "1". If, on the contrary, the midpoint sample MS [m] is "0", DOWN[m] becomes "0" and UP[m] becomes "1".

In addition, the signal ES becomes "0" if DS[m−3], DS[m−2], DS[m−1] and DS[m] form a falling pattern, and therefore DOWN[m] becomes "0" and UP [m] becomes "1" if the midpoint sample MS [m] is "1". If, on the contrary, the midpoint sample MS [m] is "0", DOWN[m] becomes "1" and UP[m] becomes "0".

The phase comparison circuit 410 thus obtains the signal UP[7:0] and the signal DOWN[7:0].

The phase control circuit 480 generates a phase control signal CTR indicating the direction of adjustment and the amount of adjustment of the first clock CLK1 and the second clock CLK2, based on the signal UP[7:0] and the signal DOWN [7:0] from the phase comparison circuit 410, and outputs them the adjustment execution circuit 490.

Specifically, for example, the phase control circuit 480 compares the number of bits that are "1" in the signal UP [7:0] and the number of bits that are "1" in the signal DOWN [7:0]. If the number of bits that are "1" in the signal UP [7:0] is larger, a phase control signal CTR instructing to advance the phases of the first clock CLK1 and the second clock CLK2 is generated.

If, on the contrary, the number of bits that are "1" in the signal DOWN[7:0] is larger, the phase control circuit 480 generates a phase control signal CTR instructing to delay the phases of the first clock CLK1 and the second clock CLK2.

The amount of advancing or delaying the phases of the first clock CLK1 and the second clock CLK2 may be determined, for example, according to the difference between the number of bits that are "1" in the signal UP[7:0] and the number of bits that are "1" in the signal DOWN[7:0].

The adjustment execution circuit 490 adjusts the phases of the first clock CLK1 and the second clock CLK2 as instructed by the phase control signal CTR from the phase control circuit 480.

As can be understood from the above explanation, the clock recovery circuit including the midpoint sample acquisition circuit 300 and the phase adjustment circuit 400 is an application of the third technique of the present invention.

As thus described, the magnetic coupling communication system 100 of First Embodiment embodies the technical principle of the present invention, and whereby all the effects described when explaining the technical principle of the present invention can be realized.

Furthermore, the phase adjustment circuit 400 in the receiving device 130 of the magnetic coupling communication system 100 of First Embodiment generates 8-bit UP/DOWN signals, and adjusts the phases of the first clock CLK1 and the second clock CLK2, based on the phase control signal CTR obtained by putting together the 8-bit UP/DOWN signals. Accordingly, erroneous determination or erroneous adjustment of the shift of clock can be prevented.

With the magnetic coupling communication system 100, although an 8-bit UP/DOWN signal is generated as an example, the number of bits of the UP/DOWN signal may be any number equal to or larger than one.

It is needless to say that the number of stages (i.e., n) of adders in the addition unit 210 of the received data acquisition circuit 200 is not limited to "4" which has been exemplified.

<Second Embodiment>

Second Embodiment is also a magnetic coupling communication system. The magnetic coupling communication system is similar to the magnetic coupling communication system 100 of First Embodiment except that a transmission device transmits a plurality of pieces of data forming a rising pattern or a falling pattern at a timing according to a predetermined rule.

Figure 16:
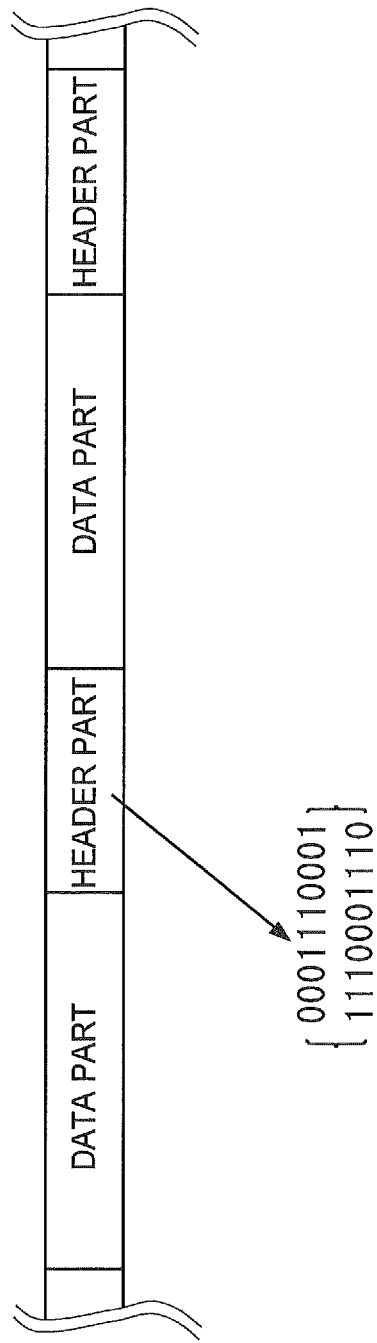
FIG. 16 shows an exemplary format of transmission data in the magnetic coupling communication system according to Second Embodiment.
Figure 17:
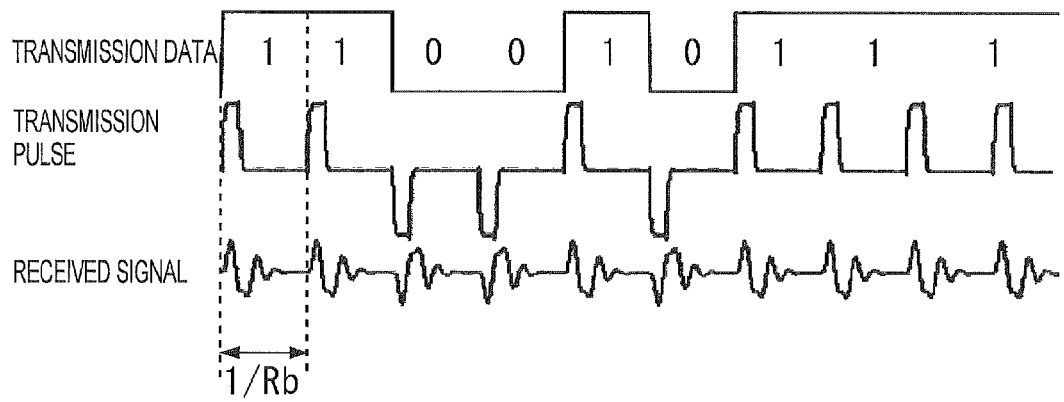
FIG. 17 is an exemplary diagram of the magnetic coupling communication system.
Figure 18:
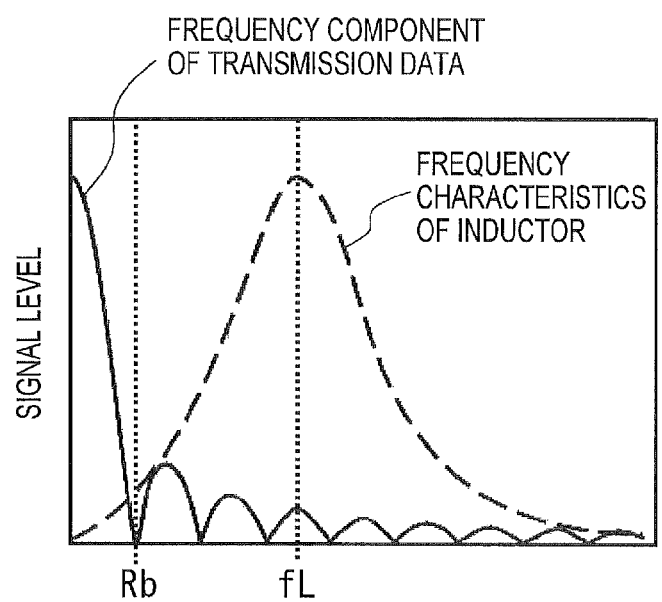
FIG. 18 shows the relation between the self-resonant frequency of the inductor and the data rate of the transmission data in the conventional magnetic coupling communication system.

FIG. 16 shows an exemplary format of the transmission data in a magnetic coupling communication system of Second Embodiment.

As illustrated, the transmission data is encoded to include a data part (payload) and a header part. The header part includes a data sequence forming a rising pattern and/or a falling pattern.

Assuming the number of pieces of data of a rising pattern and a falling pattern to be 4, for example, the data sequence of the header part may be "0001110001", "1110001110" or the like.

When the header part is "0001110001, three falling patterns (two "0001" and one "0111") and two rising patterns ("1110" and "1000") can be obtained from the header part.

In addition, when the header part is "1110001110", three rising patterns (two "1110 and one "1000") and two falling patterns ("0001" and "0111") can be obtained from the header part.

Transmission in the above format assures a data sequence with a predetermined pattern to be transmitted, and whereby the phase of the sampling clock can be corrected periodically, for example.

The present invention has been described above, based on embodiments. The embodiments are illustrative, and various modification, expansion/reduction, or combination may be performed on respective embodiments described above without deviating from the scope of the present invention. It will be understood by those skilled in the art that variations after such modification, expansion/reduction, or combination also fall within the range of the present invention.

What is claimed is:

1. A receiving circuit which receives, via a transmission path formed by magnetic coupling of inductors at a transmission side and a receiving side, a signal corresponding to transmission data having a data rate equal to or higher than a self-resonant frequency of the inductors, the receiving circuit comprising:
    a received data acquisition circuit which performs a decision-feedback equalization process on the received signal to obtain a shaped signal and, according to a sampling clock, performs sampling of the shaped signal with a same sampling rate as the data rate to obtain data samples; and
    a clock recovery circuit which corrects the sampling clock so that the received data acquisition circuit performs sampling at a correct sampling timing,
    wherein the clock recovery circuit includes:
    a midpoint sample acquisition circuit which performs sampling of the received signal at an intermediate timing of the sampling timing of the received data acquisition circuit to obtain a midpoint sample; and
    a phase adjustment circuit which adjusts a phase of the sampling clock, based on the data samples and the midpoint sample.

2. The receiving circuit according to claim 1,
    wherein the phase adjustment circuit performs the adjustment, when the successive data samples form a predetermined pattern, based on the midpoint sample obtained at the intermediate timing immediately after a sampling timing of a last data sample of the data samples.

3. The receiving circuit according to claim 2,
    wherein the predetermined pattern is a rising pattern or a falling pattern,
    wherein the rising pattern is a pattern such that
    when the sampling clock is correct,
    a voltage of the received signal rises in a direction toward a positive side from a negative side within a period from the sampling timing of a last data sample of the data samples forming the pattern to a next sampling timing, and becomes close to 0 at the intermediate timing immediately after the sampling timing of the last data sample,
    wherein the falling pattern is a pattern such that
    a voltage of the received signal falls in a direction toward a negative side from a positive side within a period from the sampling timing of a last data sample of the data samples forming the pattern to a next a sampling timing, and becomes close to 0 at the intermediate timing immediately after the sampling timing of the last data sample, and
    wherein the midpoint sample acquisition circuit performs sampling of the received signal with a threshold value of 0.

4. The receiving circuit according to claim 3,
    wherein the phase adjustment circuit,
    when the successive data samples form the rising pattern, advances the phase of the sampling clock in a case where the midpoint sample obtained at the intermediate timing immediately after the sampling timing of a last data sample of the data samples is "1", and delays the phase of the sampling clock in a case where the midpoint sample is "−1", and
    when the successive data samples form the falling pattern, delays the phase of the sampling clock in a case where the midpoint sample obtained at the intermediate timing immediately after the sampling timing of a last data sample of the data samples is "1", and advances the phase of the sampling clock in a case where the midpoint sample is "−1".

5. A clock recovery circuit which, for a receiving circuit which receives, via a transmission path formed by magnetic coupling of inductors at a transmission side and a receiving side, a signal corresponding to transmission data having a data rate equal to or higher than a self-resonant frequency of the inductors, performs a decision-feedback equalization process on the received signal to obtain a shaped signal and, according to a sampling clock, performs sampling of the shaped signal with a same sampling rate as the data rate to obtain a data sample, corrects the sampling clock so that the sampling timing of the shaped signal becomes correct, the clock recovery circuit comprising:
    a midpoint sample acquisition circuit which performs sampling of the received signal at an intermediate timing of the sampling timing of the shaped signal to obtain a midpoint sample; and
    a phase adjustment circuit which adjusts a phase of the sampling clock, based on the data sample and the midpoint sample.

6. The clock recovery circuit according to claim 5,
    wherein the phase adjustment circuit performs the adjustment, when the successive data samples form a predetermined pattern, based on the midpoint sample obtained at the intermediate timing immediately after a sampling timing of a last data sample of the data samples.

7. The clock recovery circuit according to claim 6,
    wherein the predetermined pattern is a rising pattern or a falling pattern,
    wherein the rising pattern is a pattern such that
    when the sampling clock is correct, a voltage of the received signal rises in a direction toward a positive side from a negative side within a period from a sampling timing of a last data sample of the data samples forming the pattern to a next sampling timing, and becomes close to 0 at the intermediate timing immediately after the sampling timing of the last data sample, wherein the falling pattern is a pattern such that a voltage of the received signal falls in a direction toward a negative side from a positive side within a period from a sampling timing of the last data sample of the data samples forming the pattern to a next sampling timing, and becomes close to 0 at the intermediate timing immediately after the sampling timing of the last data sample, and wherein the midpoint sample acquisition circuit performs sampling of the received signal with a threshold value of 0.

8. The clock recovery circuit according to claim 7, wherein the phase adjustment circuit, when the successive data samples form the rising pattern, advances the phase of the sampling clock in a case where the midpoint sample obtained at the intermediate timing immediately after a sampling timing of a last data sample of the data samples is "1", and delays the phase of the sampling clock in a case where the midpoint sample is "−1", and when the successive data samples form the falling pattern, delays the phase of the sampling clock in a case where the midpoint sample obtained at the intermediate timing immediately after a sampling timing of the last data sample of the data samples is "1", and advances the phase of the sampling clock in a case where the midpoint sample is "−1".

9. A communication system which transmits transmission data via a transmission path formed by magnetic coupling of inductors at a transmission side and a receiving side, the communication system comprising:

a transmission circuit which outputs a transmission signal corresponding to the transmission data at a data rate equal to or higher than a self-resonant frequency of the inductors; and a receiving circuit which generates received data from a received signal obtained by receiving the transmission signal, wherein the receiving circuit has:

a received data acquisition circuit which performs a decision-feedback equalization process on the received signal to obtain a shaped signal and, according to a sampling clock, performs sampling of the shaped signal with a same sampling rate as the data rate to obtain a data sample; and a clock recovery circuit which corrects the sampling clock so that the received data acquisition circuit performs sampling at a correct sampling timing, and wherein the clock recovery circuit has:

a midpoint sample acquisition circuit which performs sampling of the received signal at an intermediate timing of the sampling timing of the received data acquisition circuit to obtain a midpoint sample; and a phase adjustment circuit which adjusts a phase of the sampling clock, based on the data sample and the midpoint sample.

10. The communication system according to claim 9, wherein the phase adjustment circuit performs the adjustment, when the successive data samples form a predetermined pattern, based on the midpoint sample obtained at the intermediate timing immediately after a sampling timing of a last data sample of the data samples.

11. The communication system according to claim 10, wherein the predetermined pattern is a rising pattern or a falling pattern, wherein the rising pattern is a pattern such that when the sampling clock is correct, a voltage of the received signal rises in a direction toward a positive side from a negative side within a period from a sampling timing of a last data sample of the data samples forming the pattern to a next sampling timing, and becomes close to 0 at the intermediate timing immediately after the sampling timing of the last data sample, wherein the falling pattern is a pattern such that a voltage of the received signal falls in a direction toward a negative side from a positive side within a period from a sampling timing of the last data sample of the data samples forming the pattern to a next sampling timing, and becomes close to 0 at the intermediate timing immediately after the sampling timing of the last data sample, and wherein the midpoint sample acquisition circuit performs sampling of the received signal with a threshold value of 0.

12. The communication system according to claim 11, wherein the phase adjustment circuit, when the successive data samples form the rising pattern, advances a phase of the sampling clock in a case where the midpoint sample obtained at the intermediate timing immediately after a sampling timing of a last data sample of the data samples is "1", and delays the phase of the sampling clock in a case where the midpoint sample is "−1", and when the successive data samples form the falling pattern, delays the phase of the sampling clock in a case where the midpoint sample obtained at the intermediate timing immediately after a sampling timing of the last data sample of the data samples is "1", and advances the phase of the sampling clock in a case where the midpoint sample is "−1".

* * * * *